United States Patent
Wilson et al.

(10) Patent No.: US 9,571,870 B1
(45) Date of Patent: Feb. 14, 2017

(54) AUTOMATIC DETECTION OF PREFERENCES FOR SUBTITLES AND DUBBING

(71) Applicant: NETFLIX, INC., Los Gatos, CA (US)

(72) Inventors: Haley Wilson, Mountain View, CA (US); Eddy Wu, Mountain View, CA (US); Ritesh Makharia, Santa Clara, CA (US); Taskin Rahman, Cupertino, CA (US); Philip Fisher-Ogden, Pleasanton, CA (US)

(73) Assignee: Netflix, Inc., Los Gatos, CA (US)

( * ) Notice: Subject to any disclaimer, the term of this patent is extended or adjusted under 35 U.S.C. 154(b) by 233 days.

(21) Appl. No.: 14/332,287

(22) Filed: Jul. 15, 2014

(51) Int. Cl.
*G06F 17/28* (2006.01)
*G10L 15/00* (2013.01)
(Continued)

(52) U.S. Cl.
CPC ...... *H04N 21/25891* (2013.01); *G06F 17/275* (2013.01); *G06F 17/289* (2013.01);
(Continued)

(58) Field of Classification Search
CPC .... G06F 17/28; G06F 17/2809; G06F 17/289; H04N 5/278; H04N 2005/4412; H04N 2005/44526; H04N 7/0885; H04N 13/0062; H04N 13/007; H04N 21/4856; H04N 21/4884
(Continued)

(56) References Cited

U.S. PATENT DOCUMENTS

| 6,166,778 | A | * | 12/2000 | Yamamoto et al. .......... 348/569 |
| 6,661,466 | B1 | | 12/2003 | Kou |

(Continued)

FOREIGN PATENT DOCUMENTS

| WO | WO 2010/143224 | 12/2010 |
| WO | WO2011/146059 | 11/2011 |

OTHER PUBLICATIONS

European Patent Office, "Search Report" in application No. PCT/2015/040363, dated Sep. 22, 2015, 16 pages.
(Continued)

*Primary Examiner* — Paras D Shah
(74) *Attorney, Agent, or Firm* — Hickman Palermo Becker Bingham LLP (57) ABSTRACT

In an approach, a server computer receives a request from a client computer specifying particular content for a particular user, wherein the particular content is associated with an original audio language. In response to receiving the request, the server computer selects a preferred audio language and a preferred subtitle language for the particular content based on a particular record of a preference database. The server computer returns asset identifying data that the client computer uses to obtain a stream of the particular content using the preferred audio language and the preferred subtitle language from a content delivery network (CDN) or other asset location. The server computer receives a message from the client computer that identifies an presented audio language and a presented subtitle language that were presented to the particular user while the particular content streamed. In response to a determination that the presented audio language differs from the preferred audio language or that the presented subtitle language differs from the preferred subtitle language, the server computer updates the particular record in the preference database.

20 Claims, 4 Drawing Sheets

(51) Int. Cl.
*H04N 21/258* (2011.01)
*H04N 5/278* (2006.01)
*H04N 21/4722* (2011.01)
*G06F 17/27* (2006.01)
*H04N 21/81* (2011.01)

(52) U.S. Cl.
CPC ....... *G10L 15/005* (2013.01); *H04N 21/4722* (2013.01); *H04N 21/8106* (2013.01)

(58) Field of Classification Search
USPC .................................. 704/2–9; 348/739, 844
See application file for complete search history.

(56) References Cited

U.S. PATENT DOCUMENTS

| | | | |
|---|---|---|---|
| 7,051,360 B1* | 5/2006 | Ellis et al. | 725/136 |
| 7,259,795 B2* | 8/2007 | Lee | 348/569 |
| 7,487,096 B1* | 2/2009 | Cox | G10L 15/005 348/468 |
| 8,381,256 B2* | 2/2013 | Kato | 725/110 |
| 2004/0042763 A1* | 3/2004 | Morita et al. | 386/46 |
| 2004/0197087 A1* | 10/2004 | Kim | 386/96 |
| 2005/0191034 A1* | 9/2005 | Sakon | G11B 27/105 386/240 |
| 2007/0211168 A1* | 9/2007 | Ko et al. | 348/462 |
| 2008/0205855 A1* | 8/2008 | Takamori | 386/123 |
| 2008/0319734 A1* | 12/2008 | Kim | 704/8 |
| 2009/0175596 A1* | 7/2009 | Hirai | G11B 27/034 386/248 |
| 2010/0011405 A1 | 1/2010 | Wu | |
| 2010/0033625 A1 | 2/2010 | Choi | |
| 2010/0045866 A1 | 2/2010 | Angiolillo | |
| 2010/0098389 A1* | 4/2010 | Shimada | 386/52 |
| 2010/0106482 A1* | 4/2010 | Hardacker et al. | 704/3 |
| 2010/0265397 A1* | 10/2010 | Dasher et al. | 348/468 |
| 2010/0283898 A1* | 11/2010 | Mears | 348/468 |
| 2010/0322588 A1* | 12/2010 | Schultz et al. | 386/200 |
| 2011/0164175 A1* | 7/2011 | Chung et al. | 348/468 |
| 2012/0082434 A1* | 4/2012 | Ashbrook et al. | 386/248 |
| 2012/0316860 A1* | 12/2012 | Reitan | G06F 17/289 704/2 |
| 2014/0150009 A1* | 5/2014 | Sharma | 725/28 |
| 2014/0163949 A1* | 6/2014 | Nazarian et al. | 704/2 |
| 2014/0201631 A1* | 7/2014 | Pornprasitsakul | G06F 3/0484 715/716 |
| 2016/0198232 A1* | 7/2016 | Zhan | H04N 21/4856 725/39 |

OTHER PUBLICATIONS

European Claims in application No. PCT/US2015/040363, dated Sep. 2015, 3 pages.

Anonymous, "Translate a Page to Your Language", http://web.archive.org/web/20140130033547/https://support.google.com/chrome/answer/173424?hl=en#, retrieved on Sep. 9, 2015, 2 pages.

* cited by examiner

AUTOMATIC DETECTION OF PREFERENCES FOR SUBTITLES AND DUBBING

TECHNICAL FIELD

The present disclosure generally relates to aspects of automatic detection of user preferences for subtitles and dubbing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Over time content providers have been pressured to devise techniques to make their content accessible to an increasingly diverse viewing audience. For example, while English is still the predominant language in the United States, the population of Spanish speakers has risen over the years. Thus, if content providers want to reach a broader audience and attract additional customers, it is beneficial to also make their content available in Spanish as well as English. This same issue also applies across the globe as the trend in most areas has been for populations to become more heterogeneous over time. However, when a multimedia production is released, such as a film, the production is often originally produced in only one language, thus limiting the potential viewing audience.

Two techniques have been employed to expand the target audience for content, namely subtitling and dubbing. Subtitles are typically derived from a transcript or screenplay of the dialog or commentary in films, television programs, video games, and so forth, and are usually displayed at the bottom of the screen mirroring the content's audio track. The subtitles may be in the form of a written translation of a dialog in a foreign language or a written rendering of the dialog often used to assist the hearing impaired. Depending on the technique employed, the encoding method for subtitles may be pre-rendered with the video or separate as either graphics or text to be rendered and overlaid by the receiver. Dubbing is a post-production process in which recordings of the actors are replaced with recordings performed by the same or different actors speaking another language. Depending on the technique employed, the dubbed audio may be pre-rendered with the recording, or separate streams may be maintained for the video and audio tracks, allowing multiple audio tracks to be switched in for the same video.

Presently, techniques employed to determine which audio language and/or subtitles to display, for a given video and user, require a manual selection by the user or assumptions based on the primary language of the user's country of origin. However, in the context of an online program delivery service in which a particular user may watch many movies or other programs, the user is forced to manually and repeatedly select the audio track and subtitle settings for each video, which can be extremely tedious. Furthermore, due to the increasingly diverse viewing audiences, basing the selection on the user's country of origin becomes less accurate over time.

Another issue also arises when users have very specific preferences of audio language and/or subtitles based on the content selected for playback. For example, a bilingual user may prefer to watch French movies with English dubbing and subtitles, but will watch Spanish movies in the original language with no subtitles. Thus, the user may be forced to constantly update their audio language and/or subtitle settings to conform to their preferences. Current techniques are not able to conveniently or efficiently address user preferences for subtitles and dubbing.

DETAILED DESCRIPTION

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

Embodiments are described herein according to the following outline:

1.0 General Overview
2.0 Example Operating Environment
3.0 Audio and Subtitle Selection
4.0 Implementation Mechanisms—Hardware Overview
5.0 Extensions and Alternatives
6.0 Additional Disclosure

1.0 General Overview

Techniques for automatic detection of preferences for subtitles and dubbing are described. In an embodiment, a method comprises: receiving, by a server computer, a request from a client computer specifying particular content for a particular account, wherein the particular content is associated with an original audio language; in response to receiving the request, selecting, by the server computer, a preferred audio language and a preferred subtitle language for the particular content based on a particular record of a preference database that associates the original audio language and the particular account with the preferred audio language and the preferred subtitle language; providing, from the server computer to the client computer, asset identifying data for an asset associated with the particular content, the preferred audio language, and the preferred subtitle language; in response to input specifying a new audio language or a new subtitle language, providing different asset identifying data associated with the particular content and the new audio language or the new subtitle language; receiving, by the server computer, one or more messages from the client computer that identify an presented audio language and a presented subtitle language that were presented to the particular user in relation to the particular content; in response to a determination that the presented audio language differs from the preferred audio language or that the presented subtitle language differs from the preferred subtitle language, the server computer updating the particular record in the preference database.

In an embodiment, the method further comprises: receiving, by the server computer, during the streaming of the particular video to the client computer, a message from the client computer requesting the new audio language or the new subtitle language; in response to receiving the message from the client computer, the server computer providing the different asset identifying data associated with the particular content and the new audio language or the new subtitle language.

In an embodiment, updating the particular record in the preference database updates the preferred audio language to the presented audio language or the preferred subtitle language to the presented subtitle language, and the method further comprises: receiving, by the server computer, a second request from the client computer specifying second particular content for the particular account, wherein the second particular content is associated with the original audio language; in response to receiving the request, selecting, by the server computer, a second preferred audio language and a second preferred subtitle language for the particular content based on the particular record of a preference database; providing, by the server computer, second asset identifying data for a second asset associated with the second particular content, the second preferred audio language, and the second preferred subtitle language.

In an embodiment, the server computer updates the particular record in response to a determination that the presented audio language was presented for more than a particular threshold period of time or a percentage of time, or a determination that the presented subtitle language was presented for more than a second particular threshold period of time or a second percentage of time.

In an embodiment, the particular record specifies one or more factors including one or more of: a particular age group, a particular period of time, or a device volume setting, and the server computer selects the preferred audio language and the preferred subtitle language based on the one or more factors.

In an embodiment, the method further comprises in response to a determination that the preferred audio language or the preferred subtitle language is unavailable for streaming, selecting a backup available audio language or a backup available subtitle language in place of the preferred audio language or the preferred subtitle language.

In an embodiment, the available backup audio language or the available backup subtitle language is based on a country of origin of the particular account.

In an embodiment, the available backup audio language is based on one or more other records of the preference database that associates a different original audio language and the particular account with the available backup audio language.

In an embodiment, the available backup subtitle language is based on one or more records of the preference database that associates a different original audio language and the particular account with the available backup subtitle language.

In an embodiment, the particular record specifies one or more of: an ordered list of preferred audio languages or an ordered list of preferred subtitle languages and the available backup audio language is selected based on the ordered list of preferred audio languages or the available backup subtitle language is selected based on the ordered list of preferred subtitle languages.

In an embodiment, the preferred subtitle language is no subtitles.

As a result of the techniques described herein, the server computer can adapt the configuration of subtitle or dub preference data associated with a user account as content is played and can suggest different combinations of assets, subtitles and/or dubs in varying languages based upon changing combinations of user or account preferences; the system also can adapt to changes in preferences arising from time of day, account profile or user, nature of the content, and other factors.

In other embodiments, the invention encompasses a computer apparatus, a computer system, and a computer-readable medium configured to carry out the foregoing steps.

2.0 Example Operating Environment

Figure 1:
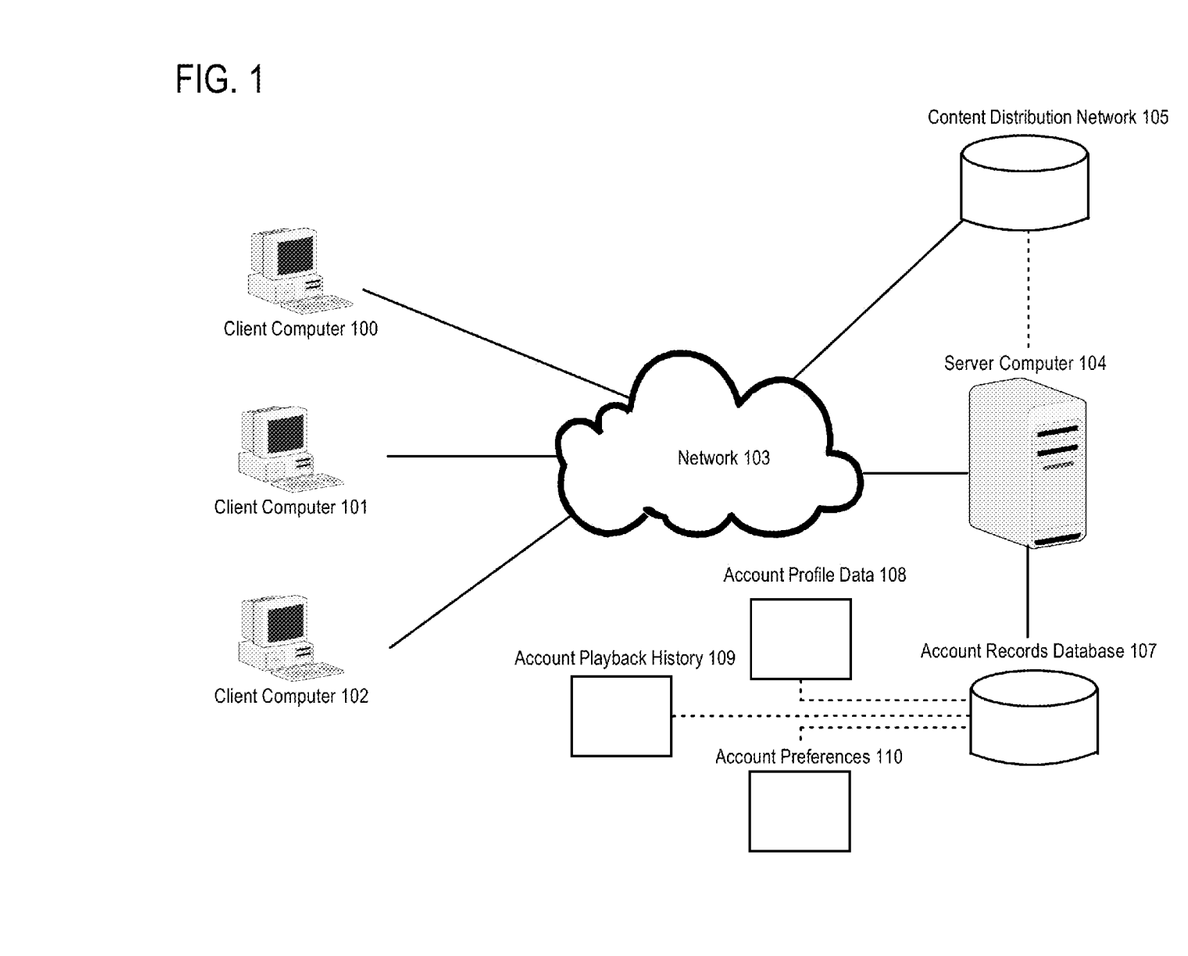
FIG. 1 illustrates an example operating environment upon which an embodiment may be implemented.

FIG. 1 illustrates an example operating environment upon which an embodiment may be implemented. In FIG. 1, client computer 100, client computer 101, and client computer 102 (collectively, "the clients") are communicatively coupled to server computer 104 and content distribution network ("CDN") 105 over network 103. The server computer 104 is communicatively coupled to account records database 107. The account records database 107 stores a number of account records, including account profile data 108, account playback history 109, and account preferences 110.

Although FIG. 1 depicts only a particular number of elements, a practical environment may contain hundreds or thousands of each depicted element. In addition, a practical environment may contain additional components which have been omitted from FIG. 1 to avoid obscuring the illustration. For example, the account records database 107 may be communicatively coupled to or accessible by the server computer 104 over one or more additional networks or by network 103. In addition, other embodiments may contain a different number of databases than illustrated in FIG. 1. For example, the account profile data 108, account playback history 109, and account preferences 110 may be stored in separate databases rather than being consolidated within account records database 107. Furthermore, in the following description, the server computer 104 will be described as collecting various information and/or metrics from the clients. However, in other embodiments, the data collection may be performed by a separate metric collection computer that acts as an intermediary between the clients and the server computer 104 and stores the information in the account records database 107.

In an embodiment, the clients represent one or more computing devices, such as personal computers, workstations, laptops, netbooks, tablet computers, game consoles, set-top boxes, digital video recorders, smartphones, and so forth. In an embodiment, the clients are configured to access a service from the server computer 104. For example, if the server computer 104 runs a web service, the clients may execute browser applications which send HTTP requests to the server computer 104. In an embodiment, the clients execute an application which accesses a video streaming service run by the server computer 104 and allows selection of one or more videos for playback on the clients or other related devices. Selection may occur via user input, programmatic input or other data sources. For example, the clients may represent set-top boxes connected to a multimedia device, such as a television, and allow accounts or users to select videos via the video streaming service for playback on the multimedia device. Furthermore, although features may be described at the level of an "account", account in this instance applies both to cases where the account covers one individual user or multiple users. Thus, all references herein to data pertaining to accounts as a whole may also pertain to individual users, as well as the converse.

In an embodiment, network 103 represents any combination of one or more local networks, wide area networks, or internetworks. Data exchanged over the networks may be transferred using any number of network layer protocols, such as Internet Protocol (IP), Multiprotocol Label Switching (MPLS), Asynchronous Transfer Mode (ATM), and Frame Relay. Furthermore, in embodiments where the networks represent a combination of multiple sub-networks, different network layer protocols may be used at each of the underlying sub-networks.

In an embodiment, the server computer 104 represents a computing device configured to provide a service to the clients. For example, the server computer 104 may represent a backend server running a streaming media service, a rental service, delivery service for movies or other audiovisual programs using technology other than streaming media, an online gaming service, an advertising service, a web site, or any other type of service. For purposes of illustrating a clear example, the service provided by the server computer 104 may be described herein as a video streaming service. However, the exact service provided by the server computer 104 is not critical to the techniques described herein. In addition, in some embodiments, the server computer 104 may represent multiple computing devices, such as a server cluster.

The CDN 105 represents one or more computer systems configured to serve download or stream requests for digital media. In other embodiments, the CDN 105 may be implemented as cloud storage or other applicable environment. For purposes of illustrating a clear example, in FIG. 1 the CDN 105 is shown as associated with server computer 104, but in other embodiments the CDN 105 may be remotely located with respect to server computer 104 and distributed across a large number of servers, storage systems, and the like. In an embodiment, the content distribution network 105 includes a collection of storage devices upon which are stored multimedia assets. In an embodiment, the CDN 105 stores, for particular multimedia content, one or more pre-rendered videos corresponding to different available audio languages. For example, for a particular film, the CDN 105 may store an asset corresponding to the English language, an asset corresponding to the French language, an asset corresponding to the Spanish language, and so forth.

In operation, any of the clients may request a particular program title, such as a particular movie or TV show, from the server computer 104. In response, the server computer determines a location in CDN 105 over which is distributed one or more files or assets representing encodings of the requested program that can be streamed to the requesting client. The server computer 104 returns a location identifier for the CDN 105 to the requesting client. The requesting client establishes a connection to the CDN 105 and obtains a data stream from the location without involving the server computer 104 in the streaming delivery of the program. However, in other embodiments, the server computer 104 may act as an intermediary between the clients and the CDN 105 receiving and forwarding requests and content.

In CDN 105, the assets may be further categorized based on quality of the video or bitrate of the audio. For example, the clients may automatically adjust the asset that they request based on factors such as speed, bandwidth, and reliability of the underlying network 103. During times when network 103 is congested, the clients may automatically adjust to a lower video or audio quality which, in most cases, will cause less data to be transported across the network 103. Thus, for example, the CDN 105 may store multiple same-language assets for a given film, TV show, documentary, and so forth that correspond to the different video qualities and/or audio bit rates that the clients can automatically switch between while streaming. Furthermore, CDN 105 may store one or more subtitle encodings for each film corresponding to subtitles for different languages. Thus, when one of the multimedia assets is streamed to the clients, the subtitle encoding can be sent along with the stream such as to cause the clients to display the subtitles along with the media asset being presented. However, in other embodiments, the subtitle encodings may be pre-rendered with the media, creating a further category of assets based on subtitle language. The exact form of the asset is not critical to the techniques described herein.

In another embodiment, the CDN 105 stores separate video tracks, audio tracks, and/or subtitle encodings for titles. For example, the CDN 105 may store, for each video that the server computer 104 provides for the video streaming service, one or more audio tracks and/or one or more subtitle encodings for the video. In an embodiment, the audio tracks are categorized based on bitrate and/or the language of the audio track. For example, a particular video may have two corresponding English audio tracks corresponding to a lower and a higher quality bitrate, as well as audio tracks corresponding to Spanish and Chinese dubs. Thus, when the clients request a video, the CDN 105 synchronizes the video track with the selected audio track and subtitle encoding and sends the combination in a stream to the clients. In other embodiments, the CDN 105 may send the video track, audio track, and encoding information in two or more separate channels for the clients to combine on the fly for presentation to an end user. For such embodiments, despite being formed from multiple components, the following description will still refer to the combination of the components as an "asset".

In some embodiments, the CDN 105 contains metadata for the multimedia assets, such as specifying the language of the asset, the original production language of the media, the length of the asset, quality of the video, bitrate of the audio, and so forth.

The account records database 107 represents a collection of storage devices upon which are stored records pertaining to particular users or accounts that utilize the service provided by the server computer 104. For example, account records database 107 may present a collection of one or more hard drive disks, random access memory devices, cloud storage devices, tape drives, data warehouses, and so forth. In an embodiment, the account records database 107 stores account profile data 108, account playback history 109, and account preferences 110. In some embodiments, the account records database 107 is implemented as a relational database where each of the account profile data 108, account playback history 109, and account preferences 110 represent a table in the relational database. However, the exact implementation of the account records database 107 is not critical to the techniques described herein. For purposes of illustrating a clear example, certain sections herein may refer to performing certain actions in connection with users; in this context, the term "user" broadly includes user accounts, metadata about users, and computers associated with users, their accounts or households, so that direct interaction with natural persons is not required and any suitable technical means may be used.

In an embodiment, the account profile data 108 specifies the profile information for a given user or account, such as name, password, email, subscription model, billing information, country of origin, default language preference, and so forth. Depending on the embodiment, some of the profile information may be obtained when the account or user is established with the server computer 104; example data includes a user or account identifier and password. Other information may be obtained or updated automatically by the server computer 104 based on inference, metadata, or other available data. For example, country of origin and/or default language preference may be determined based on the IP address of a computer associated with the user or account at the time of creation or last place of login.

In an embodiment, the account profile data 108 is used by the server computer 104 to cause presentation of an interface or portal on the client computer which can be manipulated by end users to modify the account profile data 108, select videos for playback, or modify audio/subtitle settings before, during, or after playback. For example, the language used to present the portal may be determined based on the country of origin or default language preference set in the account profile data 108. However, the audio and/or subtitle settings for the playback of a particular video may instead be determined by the account preferences 110. In some embodiments, the server computer 104 allows multiple user profiles to be created for the same account. For example, the account may belong to a household containing multiple people, each of which may be associated with a different profile in the account profile data 108. Depending on the embodiment, the users associated with the same account may share one or more characteristics, such as sharing the same login and password. Consequently, the clients may provide a user interface or portal through which the users can specify, when logged into the account, which profile to use for the current session. Alternatively, each user may "log in" separately for a given account and therefore may be associated with a separate login name and password for each profile. Example techniques for establishing profiles are described in U.S. Pat. No. 7,958,529.

In an embodiment, the account playback history 109 specifies the playback history for an account or for one or more users of the service provided by the server computer 104. For example, in the context of a video streaming service, the account playback history 109 may specify the video selected, the original language of the video, the audio language selected, whether subtitles were enabled, the language to which the subtitles were set, the starting and ending time of the video playback, the starting and ending time of the audio playback, the starting and ending time for when a particular subtitle encoding was used, date of playback, and so forth. In the event that the account or user changes the audio and/or subtitle settings during playback, then the account playback history 109 may specify the aforementioned information for each segment of the playback during which the settings were changed.

In some embodiments, the server computer 104 periodically receives "heart beat" messages from the client computers 100, 101, 102 that inform the server computer 104 of the video, audio, and subtitle presented by the clients for particular audiovisual programs. For example, the "heart beat" messages may be sent every set period of time or during particular events such as changes to the user's playback (e.g. pausing the video, skipping to another scene, changing the subtitle/audio settings, and so forth). The server computer 104 then stores the video, audio, and subtitle information in the account playback history 109 of the account records database 107. In other embodiments, instead of or in addition to sending periodic heartbeat messages, the clients are configured to send an "end playback" message at the conclusion of the playback that contains the same information that would be included in the "heart beat" messages. For example, the playback may end due to the conclusion of the media being reached or by the user exiting from presentation of the media. Thus, in such embodiments, the server computer 104 may only require the log sent at the conclusion of playback to generate the records for storage in the account playback history 109. In some embodiments, before storing the records in the account playback history 109, the server computer 104 performs filtering on the records to remove data that may be inconclusive. For example, the server computer 104 may filter out any records where a particular audio and/or subtitle language was used for less than a threshold period of time, such a minute. As a result, the server computer 104 prevents preferences from being determined based on the user mistakenly selecting an option and quickly correcting to a different option.

In an embodiment, the account preferences 110 specify the preferences of one or more accounts or users for particular languages and subtitle options given a particular context. For example, the context may be based on the original language of the video. In other embodiments, the context may be dependent on non-language factors, such as the time of day the video was requested. For example, the user may have small children that go to bed at a fairly early hour. In order not to wake the children, the user may opt to watch the video with no sound or sound so low that subtitles are needed to understand what the actors are saying. Thus, for example, the account preferences 110 may specify that when an English video (or any video) is played between 8 PM and 8 AM that video should be played with English subtitles. The context may be defined by dimensions such as account, user, original language of the media, device volume, age group, and/or time of day during which the video played. However, the techniques described herein are not limited to defining the context by the aforementioned dimensions and the exact granularity at which an embodiment chooses to define the context is not critical. In some embodiments, the account preferences 110 also specify an ordered list of audio and/or subtitle preferences for each context. Thus, when the preferred audio language and/or subtitles are not available for a given video selection, the server computer 104 may select the option that is highest among the backup preferences that can be supplied based on the assets available in the CDN 105.

In an embodiment, the account preferences 110 are established by default based on the account profile data 108 for each account or user. For example, the server computer 104 may have access to metadata that specifies the most popular languages for each country. The server computer 104 then approximates, based on the user's country of origin specified in the account profile data 108 and the metadata which languages the user is likely to be familiar with and populates the defaults for the account preferences 110 accordingly. In other embodiments, the account preferences 110 may be set manually by the user via a portal displayed by the clients. However, the exact technique used to set the initial default values for the account preferences 110 is not critical to the techniques described herein.

Figure 2:
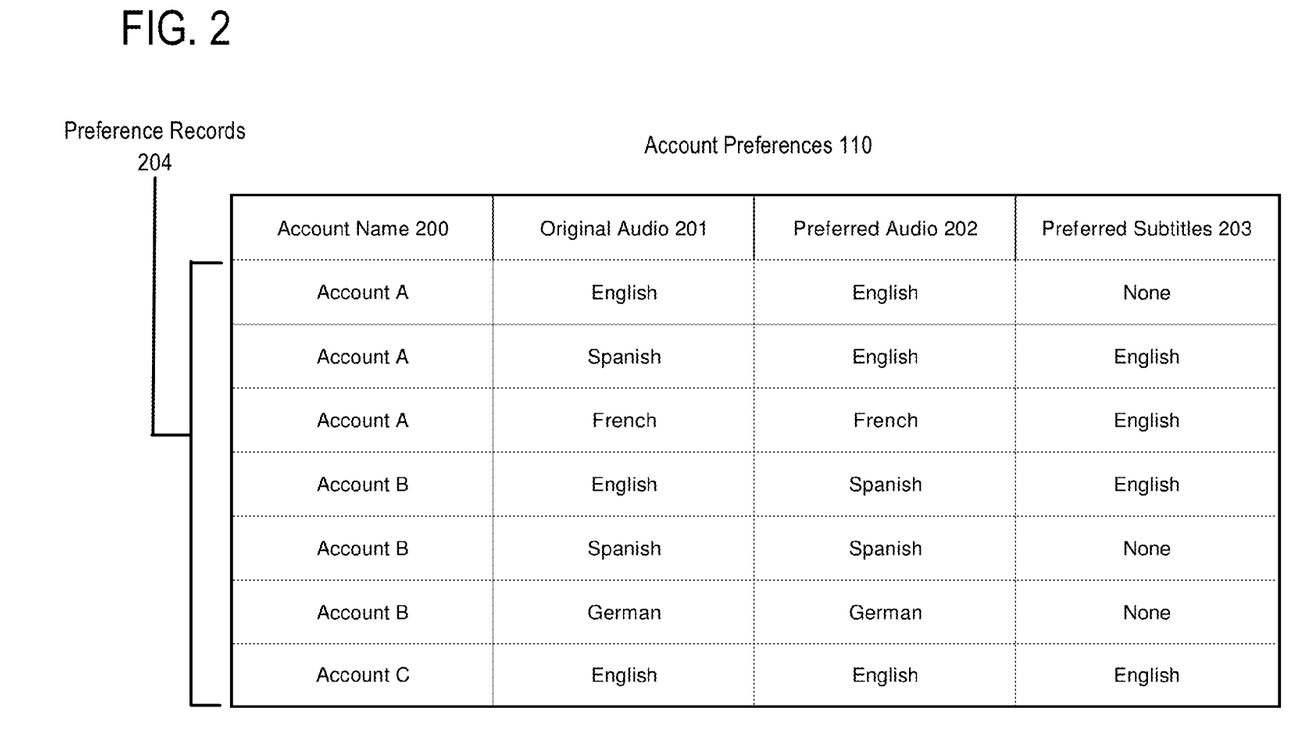
FIG. 2 illustrates a data format for the audio and subtitle language preferences according to an embodiment.

FIG. 2 illustrates an example format for the account preferences 110 according to an embodiment.

In FIG. 2, the account preferences 110 includes a number of preference records 204, each of which identify, for a given account name 200 and original audio 201, the account's preferred audio 202 and preferred subtitles 203. For example, in the depicted embodiment, the preference records 204 specify that Account A prefers to watch English movies with English audio and no subtitles, Spanish movies with English dubs and English subtitles, and French movies with French audio and English subtitles. In a practical environment, the account preferences 110 may include a record for every available language for each user, but only a subset has been depicted in order to avoid unnecessary clutter.

However, to save space, an embodiment may create a record in the preference records 204 for a given context only once that context has actually occurred. For example, a record specifying the preferences for when Account A watches a Dutch movie may only be generated and populated once Account A actually requests a Dutch movie. Furthermore, as mentioned above, other embodiments may define the context with further granularity by, for example, adding an additional column that represents the time frame of the presentation. In addition, other embodiments may include an ordered list of preferences in each cell of the preferred audio 202 and/or preferred subtitles 203 instead of a single preference. In addition, other embodiments may sub-divide the accounts described in the preference records 204 based on the individual users who utilize the account.

In some embodiments, the preference records 204 define a context that is based at least partially on the type of device that will present the video. For example, when a video is played on a mobile phone the surrounding environment may make the audio difficult to hear due to ambient background noise (e.g. a gym, an airport, a bus stop, and so forth). As a result, presenting the video with subtitles instead of or in addition to the audio may be appropriate for such situations. However, when presenting the video from a device that is more likely be located in an account holder's home (e.g. a TV, game console, set top box, and so forth), the background noise may be low enough to make the subtitles unnecessary. In some cases, the client devices may be equipped with sensors (e.g. a microphone) that can detect the ambient noise level of the surrounding environment. Thus, in some embodiments, the context takes into account the ambient noise level of the location in which the video is being played. For example, when the clients request a video from the server computer 104, the clients may send a value indicating a particular noise level (e.g. in decibels or other measurement). Depending on the embodiment, the preference records 204 may define contexts corresponding to different levels or ranges which are used by the server computer 104 to determine the appropriate subtitle and/or dubbing settings for the noise level detected by the clients. In some embodiments, the context takes into account the audio output device of the clients. For example, when the client devices are configured to provide audio through a personal audio output device (e.g. headphones, ear buds, headset, and so forth), the context may indicate that the original audio or dubs are preferred. However, when the clients are configured to use an audio output device with a broader range (e.g. speakers), the context may instead indicate that subtitles are preferred.

In another embodiment, the preference records 204 define a context that is based on an ID of the device presenting the video. For example, an account holder may have kids that watch videos via a game console and the kids prefer dubbed audio when it is available. However, the account holder may typically watch videos via a set top device with original audio and no subtitles. In cases where the account holder and the kids share the same account and/or profile, the additional granularity allows the server computer 104 to still provide a customized experience based on the devices that each group of viewers will typically use to watch videos.

In FIG. 2 the preference records 204 are depicted in tabular format, where each preference record represents a row and the attributes of each preference record are represented by columns. For example, the tabular format of FIG. 2 may be used in embodiments where the account records database 107 is configured as a relational database. However, the exact format of the data within the account records database 107 is not critical to the techniques described herein. In other embodiments, the data within the account records database 107 may be stored using an object approach, a markup language (e.g. XML) format, or a specialized format for cloud storage. For example, each of the preference records 204 may be formatted as follows:

```
{
   customerKey: {
   customerId: 1141932034
   customerGUID: null
   accountId: 1141932034
   accountGUID: null
   }
   languageSelectionDecisionTypeName: {
   label: "SUBS_OVER_DUBS"
   }
   languagePreferences: {
   it: { <-- Movie original audio
      preferredAudio: "it"
      preferredText: "en"
   }
   en: { <-- Movie original audio
      preferredAudio: "en"
      preferredText: "none"
   }
   }
}
```

3.0 Audio and Subtitle Selection

Figure 3:
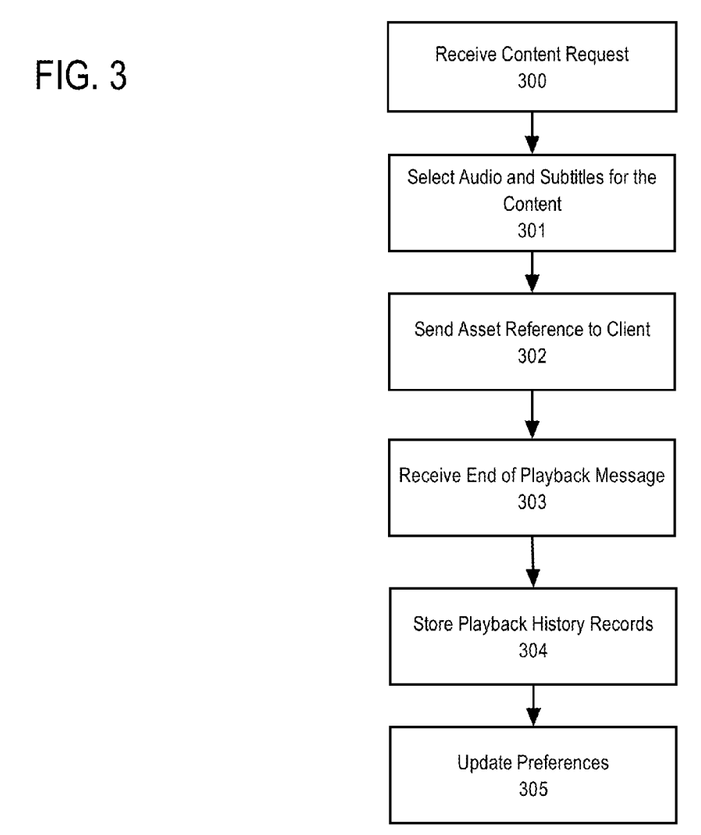
FIG. 3 illustrates a process for detecting and selecting preferences for audio and subtitle languages according to an embodiment.

FIG. 3 illustrates a process for detecting and selecting audio and subtitle preferences in block diagram form according to an embodiment. For the purpose of illustrating a clear example, it will be assumed that server computer 104 performs the process depicted in FIG. 3 while the CDN 105 provides streaming media to client computer 100. However, the same process can be performed in the context of providing streaming media to any of the clients. In addition, it will be assumed that client computer 100 has already "logged in" with respect to an account (referred to as the "particular account") based any authentication or security measures implemented by the server computer 104. However, the authentication and/or security measures implemented by the server computer 104 are not critical to the techniques described herein. Furthermore, although the term "particular account" may be used in the following description, the same features are also applicable at the level of a particular user of the account for embodiments which allow multiple users per account.

At block 300, the server computer 104 receives a request from client computer 100 specifying particular content for the particular account. In an embodiment, the client computer 100 displays a portal for the particular account which is configured to allow the particular account to search and select titles available for streaming. In response to receiving input selecting the particular content, the client computer 100 sends one or more messages to the server computer 104 requesting the particular content.

At block 301, the server computer 104 selects an audio language and a subtitle language that will be used in assets that are provided to the client computer 100. In an embodiment, the CDN 105 stores one or more assets for each content item which correspond to different audio language and subtitle language selections. For clarity, the selection to display "no subtitles" is defined to be a subtitle "language". In response to receiving the request from the client computer 100 at block 301, the server computer 104 obtains the record of the preference records 204 in the account preferences 110 that corresponds to the current context. In this case, the context corresponds to account name 200 and original audio 201 of the particular content. Once the server computer 104 locates the appropriate record, the server computer 104 determines the corresponding preferred audio 202 and preferred subtitles 203 based on the record.

In some embodiments, the server computer 104 stores additional rules that shortcut the selection specified in the account preferences 110. For example, the server computer 104 may be configured to always, by default, present content tagged as "for children" with dubbed content that matches the original audio or subtitle selection specified by the account preferences 110. Since children are often more comfortable with spoken language, as opposed to written dialog, such settings may be appropriate for situations where a user is watching the presentation with their children, rather than alone or with members of a comparable viewing audience.

In an embodiment, the server computer 104 performs an additional check to determine whether the CDN 105 has an asset which corresponds to the preferred audio 202 and preferred subtitles 203 for the current content selection of the particular account. In response to a determination that the CDN 105 has a corresponding asset, the server computer 104 proceeds to block 302 and returns to the client computer 100 a location in CDN 105 that stores the corresponding asset. The location may be a URL, a parameterized URL, or other data sufficient to identify a network location in CDN 105 that holds the specified asset. In response, the client computer 100 establishes a connection to the CDN 105 and requests the particular asset that the server computer 104 identified. As a result, the CDN 105 begins to stream the asset to the client computer 100. In response to a determination that the CDN 105 does not have a corresponding asset, the server computer 104 searches for a backup preference and an asset or location in CDN 105 that satisfies the backup preference.

In embodiments which store an ordered list of preferences for each context, the server computer 104 checks each preference for audio language and/or subtitle language in order until an available asset is located. However, in embodiments which do not store an ordered list of backup preferences, or in the event that the list of preferences fails to locate an available asset, the server computer 104 searches the preferred audio 202 and preferred subtitles 203 of records corresponding to the same account, but different original audio 201.

For example, although the server computer 104 may not have records for the account's preferred audio language and/or subtitle language for the selected content, the server computer 104 may be able to determine other languages that the user or users of the account can understand based on the records corresponding to different original audio 201. Thus, the server computer 104 may use those other languages as a backup in the event that the preferred audio or subtitle languages are unavailable. For instance, in FIG. 2, Account A's preferred audio 202 includes both English and French. Therefore a reasonable assumption would be that the user of Account A understands both languages. As a result, should an English dub be unavailable for a Spanish original audio 201 production, the server computer 104 may substitute an available French dub as a backup preference. In other embodiments, the server computer 104 selects a backup audio or subtitle language based on the user's country of origin. For example, the server computer 104 may select the asset corresponding to the most popular language in the account's country of origin.

In some embodiments, the server computer 104 maintains records of multiple assets for each audio language and/or subtitle language corresponding to audio and/or video quality. In such embodiments, the server computer 104 may select the asset based on network conditions such as latency, bandwidth, number of dropped packets, or other indications of reliability and speed. However, in other embodiments, the server computer 104 may initially select the asset corresponding to the lowest audio and/or video quality and rely on the clients to adjust the stream on the fly once network conditions have been determined to be stable and sufficient to carry the higher quality stream without unreasonable buffering. However, in other embodiments, the server computer 104 may provide the location into CDN 105 of multiple assets corresponding to the different levels of video or audio quality and rely on the clients to determine which asset to request.

At block 302, the server computer 104 provides a location of the asset corresponding to the selected audio language and subtitle language to the client computer 100. For example, the server computer 104 may store an index that specifies, for each category of assets, the location of the asset within the CDN 105. In some embodiments, the CDN 105 may periodically supply updates for the index to the server computer 104 or supply the updates in response to a particular asset's location being changed within the CDN 105.

In an embodiment, the client computer 100 responds to receiving the location by sending a request to the CDN 105 that specifies the location. In an embodiment, the CDN 105 responds by streaming the asset corresponding to the location to the client computer 100. In an embodiment, the client computer 100, in response to receiving the stream, causes the asset to be displayed for viewing. The exact technique used by the CDN 105 to stream the asset is not critical to the techniques described herein and one skilled in the art would recognize that nearly any streaming mechanism can be used for this purpose. However, as a few examples, the stream may be prepared ahead of time by compressing the audio and video using various codecs such as MPEG-2 Audio Layer III (MP3), Vorbis, Advanced Audio Coding (AAC), H.264, or VP8. The encoded video and audio may be assembled in a container bitstream such as MPEG-4 (MP4), Flash Video (FLV), WebM, Advanced Systems Format (ASF), or Internet Streaming Media Alliance (ISMA) and then delivered by the CDN 105 to the client computer 100 using a transport protocol, such as Microsoft Media Server (MMS) or Real-time Transport Protocol (RTP).

In some embodiments, the client computer 100 may automatically switch to a different asset in mid-playback of a stream. For example, the client computer 100 may determine that network conditions have improved and are now sufficient to display the stream at a higher quality video or audio setting. As a result, the client computer 100 may determine the current frame of the asset that is being displayed (potentially taking into account frames in the buffer) and send a request to the CDN 105 that causes the CDN 105 to begin streaming the other asset starting at the same frame number to provide a virtually uninterrupted visual user experience.

In other embodiments, the client computer 100 provides an interface, such as a graphical overlay over the asset being presented, and the interface is configured to provide the option to manually change the quality, audio language, or subtitle language of the presentation. In response to receiving input to change the asset to another asset corresponding to the selected quality, audio language, or subtitle language, the client computer 100 sends a request to the server computer 104 specifying the characteristics of the requested asset. The server computer 104 then returns a location identifier, record identifier or other asset identifier of the asset in CDN 105 that corresponds to the characteristics. Based on the location identifier, record identifier or other asset identifier, the client computer 100 connects to the CDN 105 and begins streaming the specified asset from the CDN 105 in the same manner as described above with respect to automatically switching the asset being streamed. However, in other embodiments, the client computer 100 may directly request an updated asset from the CDN 105 without using the server computer 104 as an intermediary.

At block 303, the server computer 104 receives an end of playback message from the client computer 100. The end of playback message indicates that the client computer 100 ended playing a particular program, which may occur when a stream ends or when the program is terminated before the end of the stream. In an embodiment, the end of playback message specifies, for the user's current session, one or more of: the video selected, the original language of the video, the audio language selected, whether subtitles were enabled, the language to which the subtitles were set, the starting and ending time of the video playback, the starting and ending time of the audio playback, the starting and ending time for when a particular subtitle encoding was used, date of playback, location in the CDN 105, and so forth.

In some embodiments, in the event that the client computer 100 changed the audio and/or subtitle language during playback, the end of playback message specifies the aforementioned information for each segment of the content for which the audio language and subtitle language were used. In some embodiments, the client computer 100 may send periodic "heart beat" messages containing the same information for the period of time since the last "heart beat" message. In such embodiments, the server computer 104 may assemble the information in the "heart beat" messages to obtain the data for the entire session.

At block 304, the server computer 104 stores the playback information obtained via the end of playback message received at block 303 in the account playback history 109 of the account records database 107. In an embodiment, each record of the playback history 109 specifies the same information described above in relation to the end of playback message for each of the user or account playback sessions. However, in some embodiments, the server computer 104 may process the information specified in the end of playback message to obtain records that are categorized based on the audio and subtitle language that were presented to the particular account.

Thus, the playback history 109 may specify, for each playback session, the starting and ending times during which the client device presented a particular audio language and/or subtitle language for the particular account. In some embodiments, the server computer 104 may filter the playback information obtained from the end of playback message before storing that data in the playback history 109. For example, the server computer 104 may only store records corresponding to audio language and/or subtitle language presentations whose presentation exceeded a particular threshold, such as a minute. In an embodiment, in the event that multiple assets are presented to the particular account that correspond to the same audio and/or subtitle language, but different video or audio qualities, the server computer 104 combines the records for those assets to determine a complete record for the presentation of the audio language and/or subtitle language.

At block 305, the server computer 104 updates the account preferences 110 for the particular account. In an embodiment, the server computer 104 determines, for the original language of the content and the particular account, whether the audio language and the subtitle language presented during playback differ from the settings specified in the account preferences 110. If not, the server computer 104 maintains the same account preferences 110. However, in response to a determination that the audio language and/or subtitle language presented during the playback differ from the settings specified in the account preferences 110, the server computer 104 updates the account preferences 110.

In an embodiment, the server computer 104 updates the account preferences 110 based on one or more factors including, the amount and/or percentage of viewing time during which the audio language and/or subtitle language was presented, amount of historic viewing time or percentage of historic viewing time during which the account or user was presented the audio language and/or subtitle language, how recently the playback corresponding to the record occurred, and so forth. For example, the server computer 104 may update the account preferences 110 to specify the audio language and/or subtitle language for the most recent playback if the presentation time exceeded a number threshold (e.g. five minutes) and/or a percentage threshold (e.g. more than half of the playback session).

However, in other embodiments, the server computer 104 may also take into account the amount of time the user or account has spent over an entire viewing history or a recent window of the viewing history being presented with the audio language and/or subtitle language for the given context. For example, the server computer 104 may be configured to update the account preferences 110 when the audio language and/or subtitle language of the stream exceeds half of the total playtime for the context over the past month as determined from the account playback history 109 for the user or account. In addition, the server computer 104, in some embodiments, may implement a weighting scheme that weighs records more heavily the more recent the playback associated with the record. Thus, a record corresponding to a playback from a week ago may be weighed more heavily than a record corresponding to a playback from a year ago. In embodiments where the account preferences 110 store multiple ranked preferences for each context, the account preferences 110 may be updated to rank the audio and/or subtitle languages based on any of the aforementioned factors.

In some embodiments, the server computer 104, before the request at block 300 or after the end of playback at block 303 recommends one or more titles and causes those titles to be displayed by the client computer 100 to the particular account or user. An example of a recommendation system that can be used for this purpose is Carlos Gomez-Uribe et al., "Personalized Markov Chains", U.S. application Ser. No. 13/829,064 filed Mar. 14, 2013, the entire contents of which is hereby incorporated by reference for all purposes as though fully stated herein. In an embodiment, the server computer 104 bases the recommendations on the account preferences 110 by weighing titles for which the preferred audio 202 and/or preferred subtitles 203 are available. Furthermore, in some embodiments, the server computer 104 puts more weight on titles whose original language corresponds to one of the languages the user prefers based on the account preferences 110 during the recommendation process.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
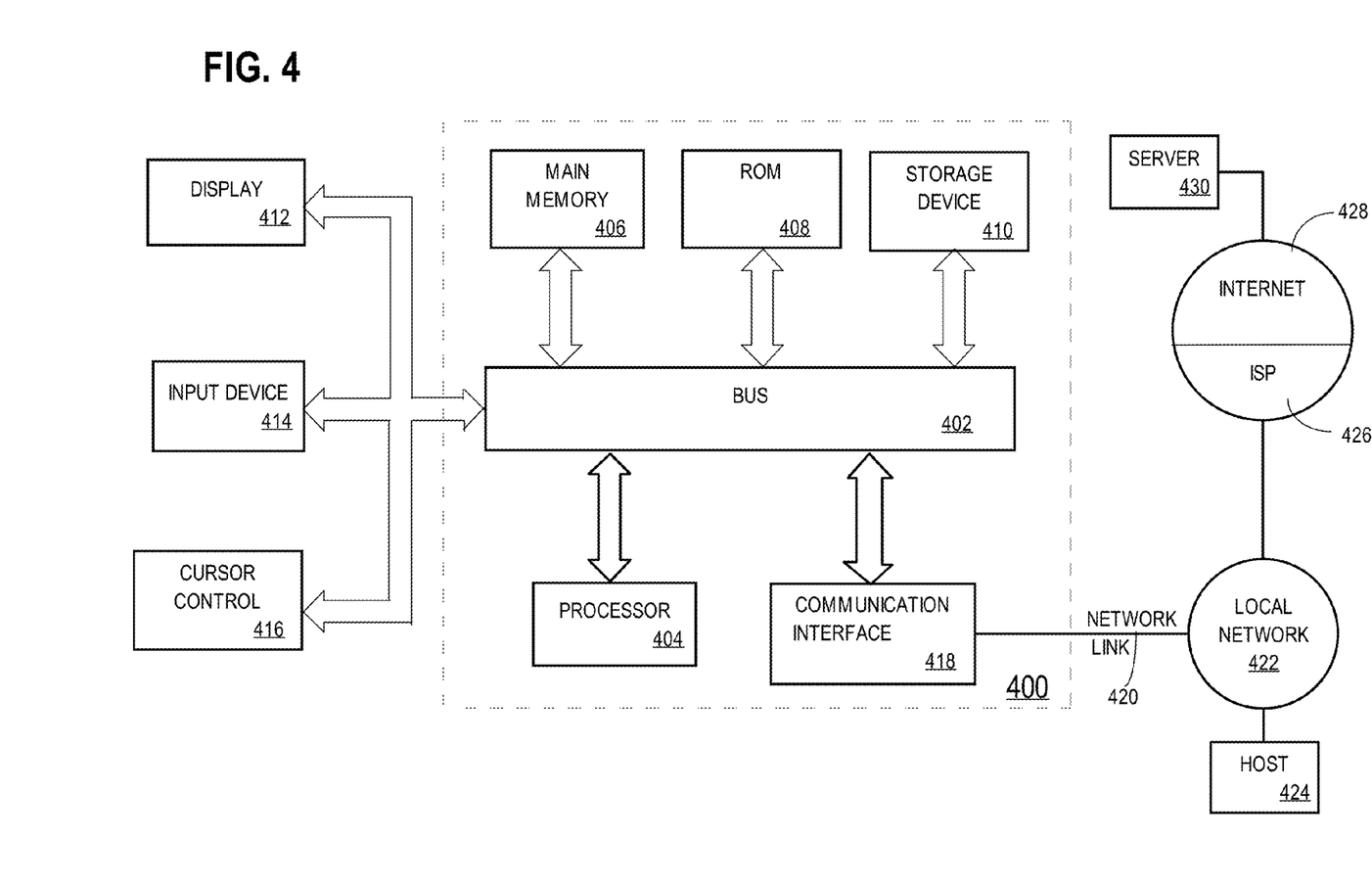
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Securely Connecting Control Device to Target Device

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

6.0 Additional Disclosure

Aspects of the subject matter described herein are set out in the following numbered clauses:

1. A method comprising: receiving, by a server computer, a request from a client computer specifying particular content for a particular account, wherein the particular content is associated with an original audio language; in response to receiving the request, selecting, by the server computer, a preferred audio language and a preferred subtitle language for the particular content based on a particular record of a preference database that associates the original audio language and the particular account with the preferred audio language and the preferred subtitle language; providing, from the server computer to the client computer, asset identifying data for an asset associated with the particular content, the preferred audio language, and the preferred subtitle language; in response to input specifying a new audio language or a new subtitle language, providing different asset identifying data associated with the particular content and the new audio language or the new subtitle language; receiving, by the server computer, one or more messages from the client computer that identify a presented audio language and a presented subtitle language that were presented to the particular user in relation to the particular content; in response to a determination that the presented audio language differs from the preferred audio language or that the presented subtitle language differs from the preferred subtitle language, the server computer updating the particular record in the preference database.

2. The method of Clause 1, further comprising: receiving, by the server computer, during the streaming of the particular video to the client computer, a message from the client computer requesting the new audio language or the new subtitle language; in response to receiving the message from the client computer, the server computer providing the different asset identifying data associated with the particular content and the new audio language or the new subtitle language.

3. The method of any of Clauses 1-2, wherein updating the particular record in the preference database updates the preferred audio language to the presented audio language or the preferred subtitle language to the presented subtitle language, and further comprising: receiving, by the server computer, a second request from the client computer specifying second particular content for the particular account, wherein the second particular content is associated with the original audio language; in response to receiving the request, selecting, by the server computer, a second preferred audio language and a second preferred subtitle language for the particular content based on the particular record of a preference database; providing, by the server computer, second asset identifying data for a second asset associated with the second particular content, the second preferred audio language, and the second preferred subtitle language.

4. The method of Clauses 1-3, further comprising the server computer updating the particular record in response to a determination that the presented audio language was presented for more than a particular threshold period of time or a percentage of time, or a determination that the presented subtitle language was presented for more than a second particular threshold period of time or a second percentage of time.

5. The method of Clauses 1-4, wherein the particular record specifies one or more factors including one or more of: a particular age group, a particular period of time, or a device volume setting, and the server computer selects the preferred audio language and the preferred subtitle language based on the one or more factors.

6. The method of Clauses 1-5, further comprising, in response to a determination that the preferred audio language or the preferred subtitle language is unavailable for streaming, selecting a backup available audio language or a backup available subtitle language in place of the preferred audio language or the preferred subtitle language.

7. The method of Clause 6, wherein the available backup audio language or the available backup subtitle language is based on a country of origin of the particular account.

8. The method of any of Clauses 6-7, wherein the available backup audio language is based on one or more other records of the preference database that associates a different original audio language and the particular account with the available backup audio language.

9. The method of any of Clause 6-8, wherein the available backup subtitle language is based on one or more records of the preference database that associates a different original audio language and the particular account with the available backup subtitle language.

10. The method of any of Clauses 6-9, wherein the particular record specifies one or more of: an ordered list of preferred audio languages or an ordered list of preferred subtitle languages and the available backup audio language is selected based on the ordered list of preferred audio languages or the available backup subtitle language is selected based on the ordered list of preferred subtitle languages.

11. The method of any of Clauses 1-10, wherein the preferred subtitle language is no subtitles.

12. A non-transitory computer-readable storage medium storing one or more instructions which, when executed by one or more processors, cause the one or more processors to perform steps comprising: receiving, by a server computer, a request from a client computer specifying particular content for a particular account, wherein the particular content is associated with an original audio language; in response to receiving the request, selecting, by the server computer, a preferred audio language and a preferred subtitle language for the particular content based on a particular record of a preference database that associates the original audio language and the particular account with the preferred audio language and the preferred subtitle language; providing, from the server computer to the client computer, asset identifying data for an asset associated with the particular content, the preferred audio language, and the preferred subtitle language; in response to input specifying a new audio language or a new subtitle language, providing different asset identifying data associated with the particular content and the new audio language or the new subtitle language; receiving, by the server computer, one or more messages from the client computer that identify an presented audio language and a presented subtitle language that were presented to the particular user in relation to the particular content; in response to a determination that the presented audio language differs from the preferred audio language or that the presented subtitle language differs from the preferred subtitle language, the server computer updating the particular record in the preference database.

13. The non-transitory computer-readable storage medium of Clause 12, wherein the steps further comprise: receiving, by the server computer, during the streaming of the particular video to the client computer, a message from the client computer requesting the new audio language or the new subtitle language; in response to receiving the message from the client computer, the server computer providing the different asset identifying data associated with the particular content and the new audio language or the new subtitle language.

14. The non-transitory computer-readable storage medium of any of Clauses 12-13, wherein updating the particular record in the preference database updates the preferred audio language to the presented audio language or the preferred subtitle language to the presented subtitle language, and the steps further comprise: receiving, by the server computer, a second request from the client computer specifying second particular content for the particular account, wherein the second particular content is associated with the original audio language; in response to receiving the request, selecting, by the server computer, a second preferred audio language and a second preferred subtitle language for the particular content based on the particular record of a preference database; providing, by the server computer, second asset identifying data for a second asset associated with the second particular content, the second preferred audio language, and the second preferred subtitle language.

15. The non-transitory computer-readable storage medium of any of Clauses 12-14, further comprising the server computer updating the particular record in response to a determination that the presented audio language was presented for more than a particular threshold period of time or a percentage of time, or a determination that the presented subtitle language was presented for more than a second particular threshold period of time or a second percentage of time.

16. The non-transitory computer-readable storage medium of any of Clauses 12-15, wherein the particular record specifies one or more factors including one or more of: a particular age group, a particular period of time, or a device volume setting, and the server computer selects the preferred audio language and the preferred subtitle language based on the one or more factors.

17. The non-transitory computer-readable storage medium of any of Clauses 12-16, wherein the steps further comprise: in response to a determination that the preferred audio language or the preferred subtitle language is unavailable for streaming, selecting a backup available audio language or a backup available subtitle language in place of the preferred audio language or the preferred subtitle language.

18. The non-transitory computer-readable storage medium of Clause 17, wherein the available backup audio language or the available backup subtitle language is based on a country of origin of the particular account.

19. The non-transitory computer-readable storage medium of any of Clauses 17-18, wherein the available backup audio language is based on one or more other records of the preference database that associates a different original audio language and the particular account with the available backup audio language.

20. The non-transitory computer-readable storage medium of any of Clauses 17-19, wherein the available backup subtitle language is based on one or more records of the preference database that associates a different original audio language and the particular account with the available backup subtitle language.

21. The non-transitory computer-readable storage medium of any of Clause 17-20, wherein the particular record specifies one or more of: an ordered list of preferred audio languages or an ordered list of preferred subtitle languages and the available backup audio language is selected based on the ordered list of preferred audio languages or the available backup subtitle language is selected based on the ordered list of preferred subtitle languages.

22. The non-transitory computer-readable storage medium of any of Clauses 12-21, wherein the preferred subtitle language is no subtitles.

What is claimed is:

1. A method comprising:
receiving, by a server computer, a request from a client computer specifying particular content for a particular account, wherein the particular content is associated with an original audio language;

in response to receiving the request, selecting, by the server computer, a preferred audio language and a preferred subtitle language for the particular content based on a particular record of a preference database that maps the original audio language and the particular account to the preferred audio language and the preferred subtitle language;

wherein the preference database includes a plurality of records for the particular account, wherein each record of the plurality of records maps a different original audio language to a respective preferred audio language and a respective preferred subtitle language;

wherein a first record of the plurality of records maps a first original audio language to a first combination of preferred audio language and preferred subtitle language and a second record of the plurality of records maps a second original audio language to a second combination of preferred audio language and preferred subtitle language, wherein the first original audio language is different than the second original audio language and the first combination is different than the second combination;

providing, from the server computer to the client computer, asset identifying data for an asset associated with the particular content, the preferred audio language, and the preferred subtitle language;

in response to receiving a message at the server computer from the client computer representing input which specifies a new audio language or a new subtitle language, providing different asset identifying data associated with the particular content and one or more of: the new audio language or the new subtitle language;

receiving, by the server computer, one or more messages from the client computer that identify a presented audio language and a presented subtitle language that were presented to a particular user of the particular account in relation to the particular content;

in response to a determination that one or more of: the presented audio language differs from the preferred audio language or that the presented subtitle language differs from the preferred subtitle language, the server computer updating the particular record in the preference database to specify that one or more of: the preferred audio language is the presented audio language or the preferred subtitle language is the presented subtitle language;

receiving, by the server computer, a second request from the client computer specifying second particular content for the particular account, wherein the second particular content is associated with the original audio language;

in response to receiving the request, selecting, by the server computer, a second preferred audio language and a second preferred subtitle language for the second particular content based on the particular record of the preference database for the particular account and the original language, wherein one or more of: the second preferred audio language is the presented audio language of the particular content or the second preferred subtitle language is the presented subtitle language for the particular content;

providing, from the server computer to the client computer, second asset identifying data for a second asset associated with the second particular content, the second preferred audio language, and the second preferred subtitle language.

2. The method of claim 1, further comprising the server computer updating the particular record in response to a determination that the presented audio language was presented for more than a particular threshold period of time or a percentage of time, or a determination that the presented subtitle language was presented for more than a second particular threshold period of time or a second percentage of time.

3. The method of claim 1, wherein the particular record specifies one or more factors including one or more of: a particular age group, a particular period of time, or a device volume setting, and the server computer selects the preferred audio language and the preferred subtitle language based on the one or more factors.

4. The method of claim 1, further comprising, in response to a determination that the preferred audio language or the preferred subtitle language is unavailable for streaming, selecting a backup available audio language or a backup available subtitle language in place of the preferred audio language or the preferred subtitle language.

5. The method of claim 4, wherein the available backup audio language or the available backup subtitle language is based on a country of origin of the particular account.

6. The method of claim 4, wherein the available backup audio language is based on one or more other records of the preference database that associates a different original audio language and the particular account with the available backup audio language.

7. The method of claim 4, wherein the available backup subtitle language is based on one or more records of the preference database that associates a different original audio language and the particular account with the available backup subtitle language.

8. The method of claim 4, wherein the particular record specifies one or more of: an ordered list of preferred audio languages or an ordered list of preferred subtitle languages and the available backup audio language is selected based on the ordered list of preferred audio languages or the available backup subtitle language is selected based on the ordered list of preferred subtitle languages.

9. The method of claim 1, wherein the preferred subtitle language is no subtitles.

10. A non-transitory computer-readable storage medium storing one or more instructions which, when executed by one or more processors, cause the one or more processors to perform steps comprising:

receiving, by a server computer, a request from a client computer specifying particular content for a particular account, wherein the particular content is associated with an original audio language;

in response to receiving the request, selecting, by the server computer, a preferred audio language and a preferred subtitle language for the particular content based on a particular record of a preference database that maps the original audio language and the particular account to the preferred audio language and the preferred subtitle language;

wherein the preference database includes a plurality of records for the particular account, wherein each record of the plurality of records maps a different original audio language to a respective preferred audio language and a respective preferred subtitle language;

wherein a first record of the plurality of records maps a first original audio language to a first combination of preferred audio language and preferred subtitle language and a second record of the plurality of records maps a second original audio language to a second combination of preferred audio language and preferred subtitle language, wherein the first original audio language is different than the second original audio language and the first combination is different than the second combination;

providing, from the server computer to the client computer, asset identifying data for an asset associated with the particular content, the preferred audio language, and the preferred subtitle language;

in response to receiving a message at the server computer from the client computer representing input which specifies a new audio language or a new subtitle language, providing different asset identifying data associated with the particular content and one or more of: the new audio language or the new subtitle language;

receiving, by the server computer, one or more messages from the client computer that identify a presented audio language and a presented subtitle language that were presented to a particular user of the particular account in relation to the particular content;

in response to a determination that one or more of: the presented audio language differs from the preferred audio language or that the presented subtitle language differs from the preferred subtitle language, the server computer updating the particular record in the preference database to specify that one or more of: the preferred audio language is the presented audio language or the preferred subtitle language is the presented subtitle language;

receiving, by the server computer, a second request from the client computer specifying second particular content for the particular account, wherein the second particular content is associated with the original audio language;

in response to receiving the request, selecting, by the server computer, a second preferred audio language and a second preferred subtitle language for the second particular content based on the particular record of the preference database for the particular account and the original language, wherein one or more of: the second preferred audio language is the presented audio language of the particular content or the second preferred subtitle language is the presented subtitle language for the particular content;

providing, from the server computer to the client computer, second asset identifying data for a second asset associated with the second particular content, the second preferred audio language, and the second preferred subtitle language.

11. The method of claim 1, wherein the message is received while the particular content is being streamed to the client computer.

12. The non-transitory computer-readable storage medium of claim 10, further comprising the server computer updating the particular record in response to a determination that the presented audio language was presented for more than a particular threshold period of time or a percentage of time, or a determination that the presented subtitle language was presented for more than a second particular threshold period of time or a second percentage of time.

13. The non-transitory computer-readable storage medium of claim 10, wherein the particular record specifies one or more factors including one or more of: a particular age group, a particular period of time, or a device volume setting, and the server computer selects the preferred audio language and the preferred subtitle language based on the one or more factors.

14. The non-transitory computer-readable storage medium of claim 10, wherein the steps further comprise:
in response to a determination that the preferred audio language or the preferred subtitle language is unavailable for streaming, selecting a backup available audio language or a backup available subtitle language in place of the preferred audio language or the preferred subtitle language.

15. The non-transitory computer-readable storage medium of claim 14, wherein the available backup audio language or the available backup subtitle language is based on a country of origin of the particular account.

16. The non-transitory computer-readable storage medium of claim 14, wherein the available backup audio language is based on one or more other records of the preference database that associates a different original audio language and the particular account with the available backup audio language.

17. The non-transitory computer-readable storage medium of claim 14, wherein the available backup subtitle language is based on one or more records of the preference database that associates a different original audio language and the particular account with the available backup subtitle language.

18. The non-transitory computer-readable storage medium of claim 14, wherein the particular record specifies one or more of: an ordered list of preferred audio languages or an ordered list of preferred subtitle languages and the available backup audio language is selected based on the ordered list of preferred audio languages or the available backup subtitle language is selected based on the ordered list of preferred subtitle languages.

19. The non-transitory computer-readable storage medium of claim 10, wherein the preferred subtitle language is no subtitles.

20. The non-transitory computer-readable storage medium of claim 10, wherein the message is received while the particular content is being streamed to the client computer.

* * * * *